Oct. 4, 1960  G. C. HENDERSON  2,954,743
MONORAIL TRACK AND TROLLEY
Filed July 2, 1958  2 Sheets-Sheet 2

INVENTOR.
GEORGE C. HENDERSON
BY
*J. Murray*
ATTORNEY

# United States Patent Office

2,954,743
Patented Oct. 4, 1960

2,954,743

MONORAIL TRACK AND TROLLEY

George C. Henderson, 27214 W. Six Mile Road, Detroit 40, Mich.

Filed July 2, 1958, Ser. No. 746,282

2 Claims. (Cl. 104—93)

This invention relates to monorail tracks and trolleys and particularly to improvements thereon to maintain engagement of driving wheels with traction faces of a rail, and to accentuate traction of said wheels on said faces during acceleration.

A major difficulty in monorail vehicles traveling on metal tracks is attaining adequate traction for the drive wheels of such vehicles. This is particularly a problem during acceleration of a vehicle when inertia of the vehicle and its load must be overcome. Under such conditions the drive wheels tend to slip on the traction faces, whereby power is wastefully expended and the wheels and traction faces are subjected to undue wear.

A further difficulty is maintaining engagement of the drive wheels with the traction faces; that is, to prevent the wheels from "jumping the track."

An object of the invention is to attain a high degree of traction by forming a rail at its opposite sides with traction faces having an acute downward divergency, and to provide a trolley frame with drive wheels accommodating said divergency whereby said traction faces have a wedging relation to said drive wheels.

Another object is to provide guide wheels on the trolley engageable with guide faces on said rail to accentuate traction between the drive wheels and traction faces during acceleration of the trolley.

Another object is to form said guide faces with an acute upward divergency and to accommodate said guide wheels to such divergency whereby engagement of the drive wheels on the downwardly divergent traction faces is maintained.

Still another object is to provide means for driving said drive wheels.

These and various other objects are attained in the construction hereinafter described and illustrated in the accompanying drawings, wherein.

Figure 1:
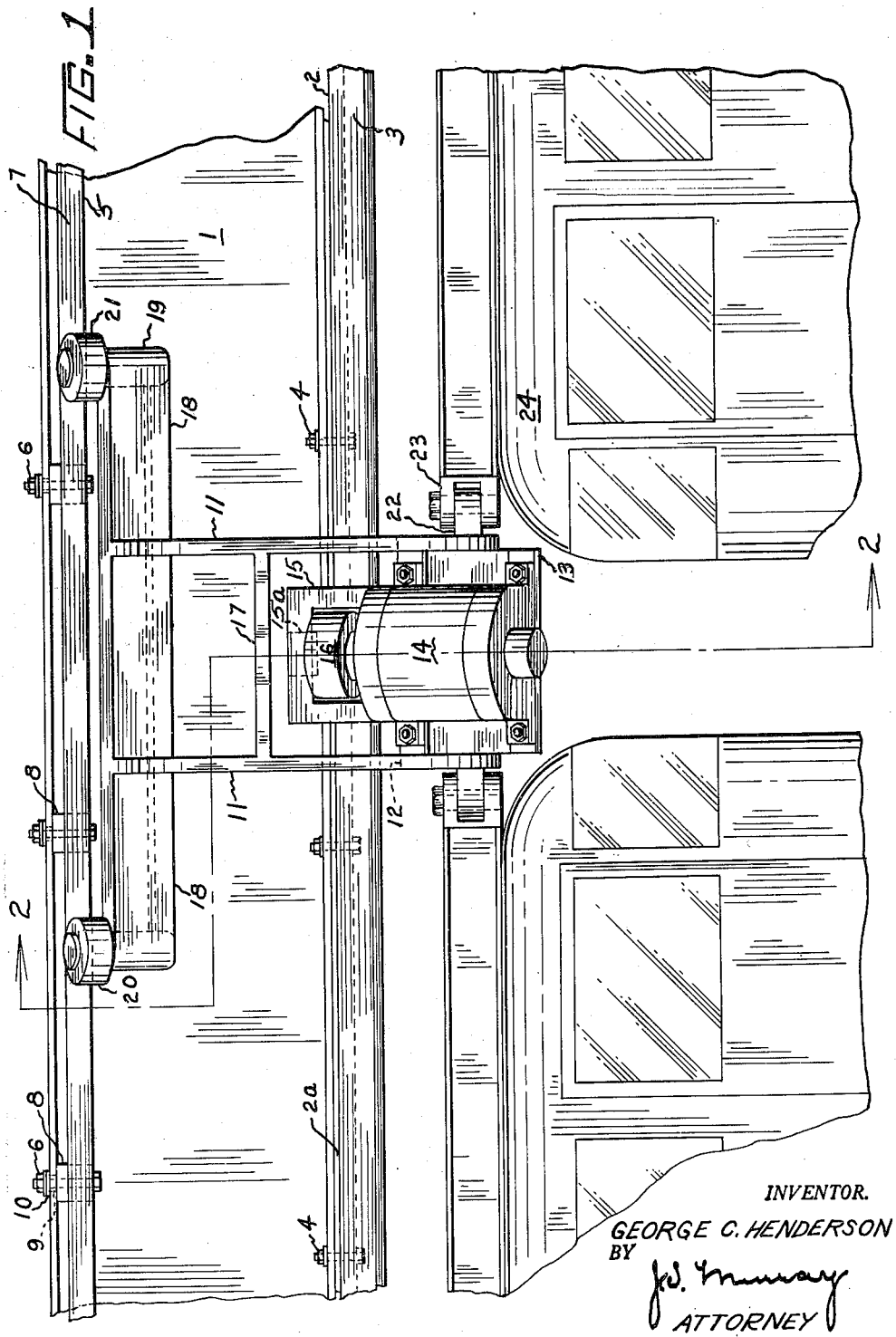
Fig. 1 is a side elevation of the construction.
Figure 2:
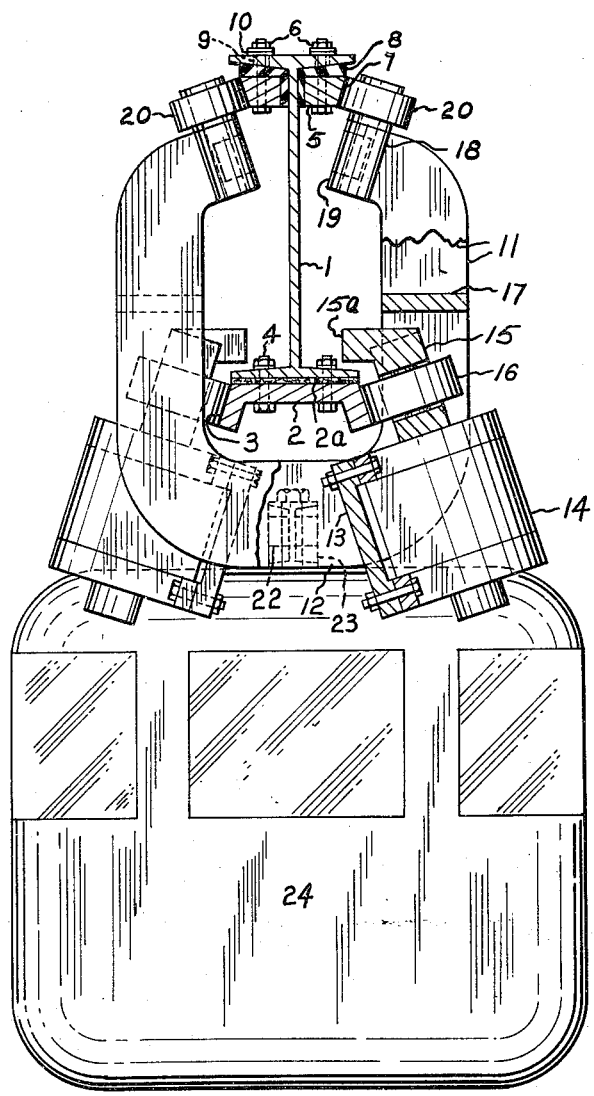
Fig. 2 is an end elevational view of the trolley and track in partial section on the line 2—2 of Fig. 1.

In there views, the reference character 1 designates an I-beam forming part of a monorail track. Such track further includes an electrically conductive, trolley-supporting rail 2 formed on its opposite sides with traction faces 3 having an acute downward divergency. Bolts and nuts 4 may be used to secure the rail 2 to and beneath the lower flanges of said I-beam. A sound deadening pad 2a is preferably interposed between said rail 2 and the I-beam.

Electrically conductive guide rails 5 are disposed at opposite sides of the beam 1 and secured to and beneath the upper flanges thereof by nuts and bolts 6. Said guide rails are formed with guide faces 7 having an acute upward divergency. Electrical insulation 8 is interposed between the guide rails and beam 1, and nonconductive sleeves 9 and washers 10 insulate the bolts and nuts from said beam.

The described construction may be secured to any overlying supportive elements (not shown) suitable to maintain said track in a desired elevated position. Such elements could include girders of bridges and other existing structures, or means especially designed and erected to support the track.

The trolley includes a frame formed by two pairs of laterally spaced, vertically elongated side members 11, disposed at opposite sides of the track and integrally joined by spans 12 extending beneath said track. As clearly seen in Fig. 1, the spans 12 of said pairs are interconnected by platforms 13 which mount a pair of electric motors 14. The axes of said motors have the same downward divergency as the traction faces 3, said axes being respectively parallel to the respective faces 3. Brackets 15 are provided on the casings of such motors to journal the upper ends of the motor shafts, while allowing seating on said traction faces 3 of wheels 16 fixed on said motor shafts. Safety lugs 15a project toward each other to overhang the lower flanges of the I-beam. Such lugs engage said flanges in the event of any occurrence which would allow the trolley to drop from the rail.

The vertical mid portions of the side members 11 on each side of the track may be joined by a reinforcing strut 17. East pair of side members is integrally formed with a pair of arms 18 projecting respectively forwardly and rearwardly from such members at their upper ends. At its free end each of said arms is formed with a bearing 19 to journal the inclined axle of a guide wheel 20 or 21. Said guide wheels obviously serve to stabilize the trolley against lateral sway.

It is readily apparent that the oppositely directed divergencies of the traction faces and guide faces, respectively engaged by the respective wheels, serve to resist any material upward movement of the traction wheels, whereby said wheels cannot "jump the track." The trolley is provided at 22 with any suitable coupling means to engage corresponding pivotal couplings 23 on suspended vehicles 24. Such vehicles, while illustrated as passenger cars, may, of course, be designed to carry freight, baggage, etc.

A particular advantage resulting from the described construction is an increase in traction during acceleration of a trolley-mounted train or car. As such acceleration begins, toward the right for example, in Fig. 1, drag in the opposite direction occurs at the couplings 22, 23. Such drag tends to pull the lower end of the trolley frame in such opposite (leftward) direction, and causes the paired guide wheels 20 to bear upwardly against the guide faces 7 with increased force. The drive wheels 16 may swivel slightly on the traction faces 3 as the guide wheels take up the aforesaid clearance. This force is transmitted through the trolley frame to cause the drive wheels 16 to bear with greater force upon the traction faces 3 and increase the traction of said wheels thereon to afford a greater rate of acceleration.

An electrical circuit may be established from the guide rails through the guide wheels to said motors, and thence through the driving wheels to the rail 2, which may be grounded through the I-beam 1 to any supporting members therefor. Collector shoes (not shown) or any other suitable construction will afford alternative means of establishing such circuit.

The included angle between the traction faces 3 is of vital importance, since if such angle is excessive, there will be slippage of the drive wheels 16, whereas an unduly acute angle will have a tendency to lock such wheels. For most efficient operation, the discussed angle should be within the range 36 to 38 degrees, this being of course true also of the angle between the traction faces of the wheels 16.

What I claim is:

1. A monorail track and trolley, said track having a lower portion formed at opposite sides thereof with a pair of traction faces downwardly diverging at an acute angle and having the upper portion formed at opposite sides thereof with a pair of guide faces upwardly diverging at an acute angle, said trolley including a frame of an approximate U form having a span downwardly spaced from the track and having a pair of members rigidly engaging and upwardly extending from the span at opposite sides of the track, a pair of traction wheels journaled on the lower portion of the frame and seating on said traction faces, the axes of such wheels having substantially the same divergency as the traction faces and occupying a plane transverse to the track, a pair of guide wheels journaled on each of said upstanding frame members, said pairs respectively engaging the respective guide faces, the axes of said guide wheels having an upward divergency corresponding to that of said guide faces, the guide wheels of each pair being oppositely spaced lengthwise of the track from said plane established by the axes of the traction wheels, and means for mounting a load on the trolley in downwardly spaced relation to the track, whereby upon acceleration of the trolley, said frame tends to tilt about an axis transverse to the track and established by the traction wheels to increase the pressure downwardly applied to the track by the traction wheels.

2. In a monorail track and trolley as set forth in claim 1, each of said paired frame members being formed on its upper portion with a pair of arms projecting oppositely lengthwise of the track, and means for journaling said guide wheels on said arms.

References Cited in the file of this patent

UNITED STATES PATENTS

| | | |
|---|---|---|
| 8,324 | Cook | June 18, 1893 |
| 640,050 | Von Thal et al. | Dec. 26, 1899 |
| 767,863 | Brown | Aug. 16, 1904 |
| 843,418 | Romanoff | Feb. 5, 1907 |
| 850,136 | Cole | Apr. 16, 1907 |
| 2,175,608 | Lawrence et al. | Oct. 10, 1939 |
| 2,439,986 | Rennie | Apr. 20, 1948 |
| 2,623,475 | Fraser | Dec. 30, 1952 |
| 2,781,001 | Dovine | Feb. 12, 1957 |

FOREIGN PATENTS

| | | |
|---|---|---|
| 3,359 | Great Britain | Dec. 12, 1871 |
| 8,324 | Great Britain | June 10, 1893 |
| 916,936 | Germany | Aug. 19, 1954 |